United States Patent [19]

Huling

[11] 4,279,858
[45] Jul. 21, 1981

[54] ENERGY CONSERVATION FOR PASTEURIZER APPARATUS

[75] Inventor: James K. Huling, Belleville, Ill.

[73] Assignee: Barry-Wehmiller Company, St. Louis, Mo.

[21] Appl. No.: 97,511

[22] Filed: Nov. 26, 1979

[51] Int. Cl.³ .......................... A61L 2/04; A61L 2/24; A23C 3/027; A23L 3/04

[52] U.S. Cl. ........................................ 422/25; 99/361; 99/362; 99/483; 422/105; 422/114; 422/302; 422/304; 426/397

[58] Field of Search ............... 422/25, 302, 304, 114, 422/115, 105; 426/397; 99/361, 362, 483

[56] References Cited

U.S. PATENT DOCUMENTS

| | | | |
|---|---|---|---|
| 2,282,187 | 5/1942 | Herold et al. | 99/362 X |
| 2,333,544 | 11/1943 | Meyer | 99/361 |
| 2,466,769 | 4/1949 | Herold et al. | 99/362 X |
| 2,658,608 | 11/1953 | Wehmiller | 198/776 |
| 3,622,357 | 11/1971 | Tillman | 99/362 X |

FOREIGN PATENT DOCUMENTS 2369866 7/1978 France .......................................... 99/483

Primary Examiner—Barry Richman
Attorney, Agent, or Firm—Gravely, Lieder & Woodruff

[57] ABSTRACT

In the pasteurizing of beverages in closed containers, the containers arrive generally in a chilled state and are progressively raised in temperature approaching the pasteurizing temperature and, after being pasteurized for an appropriate time, are progressively cooled down. Apparatus of this type is provided with a source of chilled water which is available for use when skips occur in the supply of the containers, the chilled water being accumulated from the incoming containers and from common outside sources. The accumulated water in its chilled state saves substantial amounts of energy by eliminating mechanical or other means to produce the chill effect, and such source of water is constantly available under control which senses the presence of a skip in the supply of containers.

3 Claims, 1 Drawing Figure

ENERGY CONSERVATION FOR PASTEURIZER APPARATUS

BACKGROUND OF THE INVENTION

In the art of effecting pasteurization of the contents of closed containers it is common to cause the containers to travel through a closed chamber where the temperature of the containers varies in such a way as to gradually elevate the temperature of the contents to the pasteurizing temperature level and to thereafter gradually reduce the temperature of the contents to a level where the containers can be safely returned to ambient conditions. Commercially available apparatus for accomplishing the foregoing sequence in effecting pasteurization is disclosed in the prior art by Herold et al in U.S. Pat. No. 2,282,187 which issued May 5, 1942. This patent relates to pasteurizing the contents in containers by subjecting the same to successive sprays of liquid to preheat, pasteurize and cool the containers. The disclosure made by Herold et al provided for a gradual temperature change in the containers as they are caused to pass from temperature zone to temperature zone, and in proceeding in this manner a considerable quantity of live steam heat must be supplied in order to maintain the pasteurizing liquid at the required pasteurizing temperature.

An improvement was disclosed in U.S. Pat. No. 2,466,769 by Herold et al which issued Apr. 12, 1949. The disclosure in this patent is directed to a system whereby a small size pasteurizer could efficiently and economically perform all of the functions of varying temperatures of traveling containers by the economical use of hot and cold temperature regulating fluids. However, the disclosure called for the use of large quantities of live steam in order to obtain the desired temperature levels.

The assignee in the case of the above mentioned Herold et al U.S. Patents made and sold single deck and double deck pasteurizers embodying regenerated systems by interchanging water between heating and cooling zones so as to obtain an economical use of live steam and water. The regenerative system obtained economy in the use of steam and water by a counterflow of hot water against cool product at the load end of the pasteurizer and cool water against hot product at the cooling end of the pasteurizer. The pasteurizers as just above described were available commercially in about 1953 with respect to the regenerative system.

These examples of pasteurizers did not provide means for obtaining a thermal balance when skips occur in the supply of containers. Skips in the supply of containers upset ideal heat exchange considerations, but through the provision of means for conserving the use of heated fluid or steam so as to compensate for skips in the supply of containers thermal balance can be maintained, and such provisions have been disclosed in the application of James K. Huling, Ser. No. 062,693 filed Aug. 1, 1979.

BRIEF DESCRIPTION OF THE INVENTION

The present invention is directed to improvement in pasteurizer apparatus, and particularly to provisions for effecting energy conservation in pasteurizer apparatus.

The objects of the present invention are to provide apparatus with an auxiliary source of chilled liquid, such as water, which is used to overcome upsets in the thermal balance between successive preheating zones and precooling zones on opposite sides of a pasteurizing zone during the movement of skips through those zones, and to provide means for storing the chilled liquid at a place where it can be made available as needed with consequent energy savings.

Other objects of the invention are to effect a savings in the use of water, to reduce the need for refrigeration in order to obtain desired water temperature levels when a skip in the supply of containers occurs, and to avoid having to handle large quantities of local water or move large volumes of water to a chilling tower in order to gain the desired temperature differential in the various compartments of the apparatus.

Other objects of the present invention will be pointed out in the following specification, with reference to the single drawing which is a schematic longitudinal view of a single deck pasteurizer in which the present improvements have been incorporated.

The present invention is embodied in apparatus which functions to collect in an auxiliary liquid containing compartment liquid cooled by the pick up of cooling effect from incoming containers so that when a "skip" occurs in the normal supply of containers, the auxiliary cooled liquid will be available to move through the apparatus to continue the cooling down of the containers leaving the pasteurizing zone and to move the now heated liquid to the zones where heating up of the cool containers takes place in advance of the pasteurizing zone, whereby a substantial saving in the use of outside liquid and energy to cool that outside liquid is made possible.

DETAILED DESCRIPTION OF THE INVENTION

Figure 1:
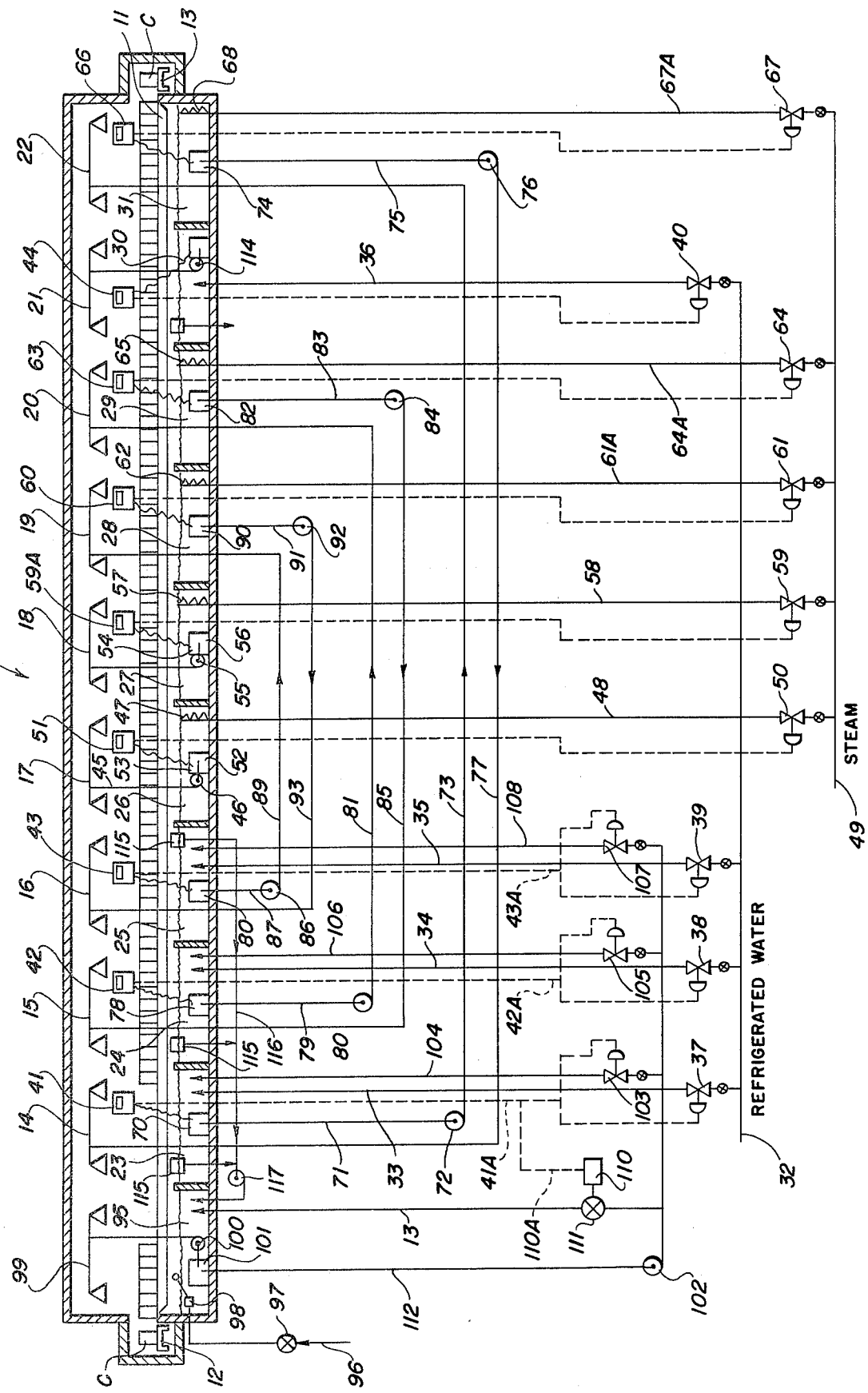

A desirable form of the present invention is shown in the single drawing view and comprises apparatus which is associated with an elongated housing 10 having conveyor 11 of the general type shown in U.S. Pat. No. 2,658,608 granted Nov. 10, 1953 for conveying apparatus to F. W. Wehmiller. Other suitable conveyor means may be used to move the product to be pasteurized through zones which progressively raises the temperature to the pasteurizing temperature and then progressively lowers the temperature before returning the product to ambient temperature conditions. The product C, whether metallic containers or glass bottles, is fed into the housing 10 by a delivery conveyor 12, is moved through the housing by the conveyor 11, and discharged onto a discharge conveyor 13.

More specifically, the apparatus includes a series of preheating showering devices 14, 15 and 16 leading up to pasteurizing showering means 17, and followed by a series of holding and precooling showering means 18, 19, 20, 21 and 22. The preheating showering means are located such that the liquid will fall through the conveyor 11 and into collecting compartments 23, 24 and 25. The pasteurizing showering means 17 is located above a compartment 26, and the holding and precooling showering means are positioned above compartments 27, 28, 29, 30 and 31 such that the liquid will fall through the conveyor 11 and be collected in these compartments.

Refrigerated or artificially cooled water from a suitable source 32 is supplied as needed through pipes 33, 34 and 35 to the respective compartments 23, 24 and 25, and by pipe 36 to compartment 30. Control valves 37, 38, 39 and 40 are inserted in those pipes respectively, and the valves are under control of temperature responsive sensors shown respectively at 41, 42, 43 and 44 so as to measure the temperature of the liquid spray from the showering means 14, 15, 16 and 21 respectively.

The pasteurizing showering means 17 is connected by pipe 45 to pump 46 disposed in the liquid compartment 26. The liquid in that compartment is heated as needed by a heat means 47 supplied by pipe 48 from a source of heat 49 under control of valve 50 which is responsive to a sensor 51 at the showering means 17. The sensor 51 is modulated by the temperature at the inlet suction box 52 adjacent the pump 46, such modulation being responsive to the sensor 53 at the box.

Following the pasteurizing zone, the showering means 18 is supplied by pipe 54 from pump 55 receiving liquid through box 56 in compartment 27. The liquid is temperature controlled by a heating means 57 supplied through pipe 58 and subject to control valve 59 which governs the input from heat source 49. The valve 59 is subject to control by the sensor 59A, modulated by a sensor located in box 56. The following sensors 60, 63, 44 and 66 are similarly modulated, as shown in the drawing.

Temperature sensor means 60 responsive to the showering means 19 modulates the valve 61 which supplies heat through pipe 61A to heat means 62 in the compartment 28 for the purpose of preparing a suitable temperature increase in the liquid to be used in compartment 25 at showering means 16 as will be presently described. In like manner, temperature sensor 63 is connected to control valve 64 which supplies heat through pipe 64A to a heating means 65 in compartment 29. The liquid in compartment 29 is connected as shown to showering means 15 for compartment 24 for a purpose which will presently appear. Continuing in the rightward direction of movement of the containers C, it is seen that the final zone of the apparatus includes a temperature sensor 66 which is connected to a valve 67 for controlling the supply of heat by pipe 67A to a heating means 68 in compartment 31. The liquid from compartment 31 is used in the showering means 14 in compartment 23.

The apparatus as arranged in the drawing is provided with a system of liquid interchange between the preheat compartments 23, 24 and 25 and the precool compartments 28, 29 and 31. For example, the first preheat compartment is provided with a suction box 70 through which the liquid flows to a suction pipe 71 leading to a pump 72 which has its discharge conduit 73 connected to the chilled water showering means 22 in compartment 31. The suction box 70 is provided to minimize or prevent ingress of material which might clog the showering means 22. Compartment 31 is provided with a similar suction box 74 for the suction line 75 to the pump 76 which has its pressure line 77 connected into the showering means 14 in the first preheat zone at compartment 23. Next, compartments 24 and 29 and the respective showering means 15 and 20 therein are interconnected such that a suction box 78 for the suction line 79 to a centrifugal pump 80 permits the pump to deliver liquid through conduit 81 into the showering means 20 at compartment 29. A suction box 82 in compartment 29 protects the inlet 83 to centrifugal pump 84 which delivers liquid through its outlet conduit 85 to the showering means 15 at compartment 24. It is shown also that there is liquid interchange between compartments 25 and 28 where centrifugal pump 86 has its inlet 87 at suction box 88 for transferring liquid from compartment 25 through conduit 89 to the showering means 19 in compartment 28. In like manner a suction box 90 is located over the inlet 91 for centrifugal pump 92 which delivers liquid through conduit 93 to the showering means 16 in compartment 25.

It shall be assumed for this part of the disclosure that the apparatus 10 has adequate liquid, such as water, at the proper levels in each compartment 23 to 31, and that a full complement of product containers C are being delivered by conveyor 12 and being carried away at conveyor 13. The several zones identified by the showering means 14, 15, 16, 17, 18, 19, 20, 21 and 22 are, therefore, filled with the product containers. It is assumed also that the containers C arrive at a temperature of about 34° F. and exit at about 70° F. They are moved by the conveyor 11 through the several preheating zones of showering means 14, 15 and 16 where the temperature is brought up in gradual stages of about 15° F. to 20° F. prior to reaching the pasteurizing temperature in zone of showering means 17 which is about 140° F. The pasteurizing temperature is held in the zone of showering means 18. The travel of the containers C then goes through progressively cooler zones of showering means 19, 20, 21 and at the last showering means 22 the temperature is lowered to about 70° to 80° F. After the apparatus 10 has been in operation for 30 to 40 minutes, and has received a full complement of containers, it attains a substantial thermal balance between the liquid system and the containers C where the pasteurizing heat extracted in the cooling zones 28, 29 and 31 is made available to bring the temperature of the containers up from the low entering temperature level to one more compatible with the pasteurizing zone temperature. The foregoing is considered to be generally normal operation known in this art.

It can be observed in the drawing that there is a compartment 95 at the inlet of the apparatus 10 through which the incoming product containers must pass when the temperature thereof is at its lowest which is substantially 34° F. Compartment 95, like all of the other compartments above referred to, is filled with liquid, which is water, from a suitable source 96. That source may be the local community supply, or it may be taken from a cooling tower or chiller (not shown) which is also connected to the refrigerated water supply conduit 32. The supply connection 96 is provided with a master shut off valve 97 and from there the conduit leads to a float valve 98 of normal construction which will permit the compartment 95 to receive make-up water to compensate for the water that would normally be carried by the product containers into the subsequent compartments. Compartment 95 is provided with showering means 99 supplied from a pump 100 having its inlet connected into the suction box 101 so that the pump 100 will constantly recirculate the water to the showering means 99 and allow it to fall over the incoming product containers so that the water in compartment 95 is brought down, by the chill of the incoming container C, to a temperature range of the order of 50° to 60° F.

The unique provision of the compartment 95 and its ability to reach a condition where the water is at a useful chill temperature will be understood when it is realized that that chilled water may be removed by pump 102 and selectively supplied through valve 103 and conduit 104 to compartment 23, or it may be supplied through valve 105 and conduit 106 to compartment 24, or it may be supplied through valve 107 and conduit 108 to compartment 25. The alternative to utilizing the water from compartment 95 for circulating into compartments 23, 24 and 25 is found in the connection through valve 37 and conduit 33 connected to compartment 23, or valve 38 and conduit 34 connected to compartment 24, or valve 39 and conduit 35 connected to compartment 25. The valves 103 and 37 are connected with and subject to the control function developed by sensor 41 responsive to the liquid issuing from showering means 14, as indicated by connection 41A. In like manner valves 105 and 38 are responsive to the sensor 42 by connection 42A which is subject to the water from showering means 15, and valves 107 and 39 are responsive to the sensor 43 by connection 43A which is sensitive to the showering means 16. When the valves 103, 105 or 107 are not open because there is no call for water from the compartment 95 supplied by pump 102, the control system includes a connection 110A to controller 110 at a by-pass valve 111 which will open to permit the pump 102 to recirculate the water through conduits 112 and 113, thereby avoiding overloading the drive motor (not shown) for pump 102.

Conservation of liquid used in the present apparatus is obtained at compartments 23, 24 and 25 by providing overflow pockets 115 with drain pipes connected into a collection line 116 having a suitable pump 117 to lift the overflow into the compartment 95. Thus, overflow liquid is able to be returned to the compartment for further cooling and to reduce the amount of make-up liquid allowed to enter at the float valve 98.

It is to be understood that when the apparatus 10 is provided with the required water in the several compartments, and the product containers are initially brought into the conveyor 11 by the feed conveyor 12, it is normally necessary to provide means for raising the temperature at the showering means 14, 15 and 16 in a progressively increasing temperature range. This is obtained by supplying heat from the source 49 to the heating means 68, 65 and 62 so that the warmed liquid will be transferred by pumps 76, 84 and 92 to the connected showering means 14, 15 and 16. Thus the containers will be raised in temperature so that when they reach the pasteurizing compartment the showering means 17 will deliver the liquid at the proper temperature of the order of 140° F. because the heating means 47 will elevate the temperature of the water in compartment 26 and pump 46 will circulate that water to the showering means 17. Sensor 51 in compartment 26 will modulate the control valve 50 as required. The product containers will advance to the compartment 27 where the pasteurizing temperature will be maintained or held by the water from the showering means 18 receiving heat from the heat means 57 which modulates the control valve 59 from the heat source 49. The pump 55 circulates the heated water in compartment 27 to the showering means 18, and the temperature sensor 59A will govern the temperature condition in this compartment.

As the containers progress into the precooling zones it can be seen that the cooling effect desired at compartment 28 and to be supplied by showering means 19 draws its liquid from compartment 25 where the temperature has been lowered because the heat has been given up to preheat the containers passing that zone. The cooling effect at showering means 19 may be determined by the sensor 43 in compartment 25 which calls for either the refrigerated water from supply 42 admitted at valve 39 or from the auxiliary chilled water supply in compartment 95 through valve 107. In like manner the heat lost to the product for preheating it while passing through showering means 15 reduces the temperature of the water which is moved by pump 80 to the precooled showering means 20 at compartment 29. This interchange of heating and cooling between the water and the containers is subject to the sensor means 42 and 63. It can be seen that a similar result is obtained in the interchange of water between compartments 23 and 31. In the interchange of temperature between the preheating and the precooling compartments, it is observed that the water in compartment 95 is available as desired through circulation set up by pump 102 when any or all of the valves 103, 105 and 107 is open so that the cooling effect of the water circulated from compartment 95 will not be recirculated past valve 111 but will be directed to the responsive compartments 23, 24 and 25 and circulated out of these compartments by the responsive pumps 72, 80 and 86 to the showering means 22 in compartment 31, showering means 20 in compartment 29 and showering means 19 in compartment 28. In this way water at a lower temperature will be provided for cooling the product as it reaches the precooling compartments 28, 29 and 31. If cooling is required at compartment 30 it will be provided by the sensor 44 opening valve 40 to obtain refrigerated or chilled water at conduit 36. The latter water reaching compartment 30 will be recirculated by pump 114 to showering means 21, whereby the desired product cooling can be obtained.

The unique function of the liquid circulating in compartment 95 by pump 100 to showering means 99 is to establish an auxiliary source of cooling liquid and in so doing initiating an increase in the temperature of the containers C. The auxiliary liquid is always available to the system of the apparatus 10 should a skip (or gap) in the flow of containers develop, and such a condition is shown in the drawing. A skip has developed between compartments 95 and 23, which means that no containers are under showering means 14 to absorb heat moved out of precooling compartment 31. Thus, containers in compartment 31 are not being cooled sufficiently and more heat is returning to showering means 14. Sensor 41, therefore modulates valves 110 and 103 so that cooled liquid from compartment 95 enters compartment 23 and is moved by pump 72 directly to showering means 22 to restore the heat balance between compartments 31 and 23 so far as the containers C are concerned. Substantially the same modulation takes place in the thermal balance as between compartments 24 and 29 as the skip reaches compartment 24. Thus, the system is able to modulate the thermal balance between the precooling and preheating zone at opposite sides of the pasteurizing and holding compartments 17 and 18 as a skip progresses through the apparatus. The progressive modulation is obtained by the way the valves 103, 105 and 107 operate in sequence to supply cooling liquid to the associated precooling showering means 22, 20 and 19 respectively. The supply of cooling liquid in compartment 95 is generated by absorbing cooling value from the incoming containers and making it available whenever a skip in the supply of containers develops. A significant saving in energy is made as it is not necessary to operate a cooling tower or a mechanical chiller. This is not to ignore the need for steam and refrigerated liquid during the time when the apparatus is started up at the beginning of a pasteurizer run, or when the apparatus is run to empty the containers at the end of such a run.

In view of the foregoing description and the disclosure in the drawing it should be appreciated that the object of the present invention is to be able to conserve energy in relation to the use of liquid such as water between the several compartments when a skip occurs in the complement of containers moving through the present apparatus. It is generally known that refrigerated water, in the sense that it may be taken from a cooling tower or an equivalent chilling apparatus, or from the local water supply if it is at the proper low temperature, and a source of steam is required during the operation of the pasteurizer at the beginning of a run and at the close down at the end of a run. However, the thermal balance within the pasteurizer apparatus may be substantially maintained by the unique arrangement of providing an auxiliary source for cooled liquid at compartment 95, and making it available at all times when a skip occurs and moves through the various compartments, thereby reducing the need for the refrigerated water. When the liquid in the auxiliary compartment 95 is not called for, it is subject to recirculation so as to maintain the temperature of the liquid within the temperature range before mentioned. While a presently preferred arrangement for providing an auxiliary cooling liquid has been shown and described, variations of such a provision may come to mind and are to be included herein based on the specific disclosure contained in the foregoing specification.

What is claimed is:

1. A process for conserving the use of water in a pasteurizer for moving initially cold containers through successive preheating zones where the containers are raised in temperature and give up the cold temperature values and through precooling zones where the containers are lowered in temperature from a pasteurizing temperature by giving up heat, the process comprising: providing a cooled water containing compartment in advance of the movement of the initially cold containers into the preheating zones and showering the cooled water over the cold containers to acquire the cooling values therefrom while raising the temperature thereof, and making the cooled water from the water containing compartment available initially for use in the precooling zones to acquire heat therefrom imparted to the containers passing out of the pasteurizing zone when a skip occurs in the movement of containers in the preheating zones.

2. A method of operating a pasteurizer having a conveyor for transporting initially cold containers from an inlet through a series of temperature increasing zones, a pasteurizing zone, and a series of temperature decreasing zones, to an outlet, the method comprising: establishing a first series of zones for delivering liquid upon containers for increasing the temperature toward a pasteurizing temperature; establishing a second series of zones for delivering a liquid upon containers for decreasing the temperature thereof after pasteurization; connecting a source of chilled liquid with the first series of zones; establishing a source of heated liquid through fluid connection with the pasteurizing zone and with certain of said second series of zones; establishing a zone of auxiliary liquid adjacent the inlet for absorbing the cooling values from the initially cold containers and initially lifting the temperature thereof; and controlling the use of the auxiliary liquid, the chilled liquid and the source of heated liquid in a predetermined sequence for accommodating the presence of a skipper arising in the first series of zones and moved by the conveyor into and through the second series of zones to the outlet.

3. The method set forth in claim 2, wherein the predetermined sequence of control is such that the presence of a skipper effects introduction of the auxiliary liquid through the first zones without contacting the containers in such zones and into the second zones for contact with the containers to acquire the heat of pasteurization, followed by the introduction of the now heated liquid from the second zones into the first zones to effect preheating of the containers by contact therewith.

* * * * *